United States Patent [19]
Brock et al.

[11] Patent Number: 5,019,305
[45] Date of Patent: May 28, 1991

[54] PROCESS FOR THE PRODUCTION OF FOAM CUSHIONS FROM DIFFERENT FLUID REACTION MIXTURES

[75] Inventors: Martin Brock, Cologne; Ralf Busch, Ketsch; Ralf Pohlig, Leichlingen, all of Fed. Rep. of Germany

[73] Assignee: Bayer Aktiengesellschaft, Bayerwerk, Fed. Rep. of Germany

[21] Appl. No.: 226,507

[22] Filed: Aug. 1, 1988

[30] Foreign Application Priority Data

Aug. 14, 1987 [DE] Fed. Rep. of Germany ....... 3727131

[51] Int. Cl.$^5$ .............................................. B29C 67/22
[52] U.S. Cl. ................................. 264/45.1; 264/46.4; 264/46.6
[58] Field of Search .............. 264/45.1, 46.4 S, 46.6 S

[56] References Cited

U.S. PATENT DOCUMENTS

| | | | |
|---|---|---|---|
| 3,786,122 | 1/1974 | Berg | 264/DIG. 14 |
| 4,180,631 | 12/1979 | Yukuta et al. | 264/54 |
| 4,190,697 | 2/1980 | Ahrens | 428/315 |
| 4,405,681 | 9/1983 | McEvoy | 264/46.6 |
| 4,714,574 | 12/1987 | Tenhagen | 264/45.1 |

Primary Examiner—Robert A. Dawson
Assistant Examiner—Allan R. Kuhns
Attorney, Agent, or Firm—Joseph C. Gil

[57] ABSTRACT

A process for the production of foam cushions from different fluid reaction mixtures comprising introducing a first and at least one other reaction mixture into a mold cavity and leaving the mixtures to react to form a cushion having zones of differing elasticity or rigidity characterized in that the reaction mixtures are not introduced into the mold cavity until they have started to cream up and are already viscous.

2 Claims, No Drawings

PROCESS FOR THE PRODUCTION OF FOAM CUSHIONS FROM DIFFERENT FLUID REACTION MIXTURES

BACKGROUND OF THE INVENTION

The present invention relates to a process for the production of foam cushions from different fluid reaction mixtures. The resultant cushion consists of at least two foams differing correspondingly in elasticity or rigidity. Preferred are those reaction mixtures leading to polyurethane foams. In the process, a first and at least one other reaction mixture are introduced into a mold cavity and left to react to form a cushion having zones of different elasticity or rigidity before the cushion is removed from the mold.

The production of molded parts, and in particular cushions, by foaming in molds is becoming more widely used over the previously employed method of cutting. The foaming-in-the-mold method is relatively simple and can be carried out almost loss free. When this process of foaming in the mold is employed, the cushions are either subsequently covered with a textile cover or the cover is directly back-foamed in a vacuum mold.

Various processes have been proposed for the production of molded parts composed of zones of differing rigidity.

According to EP-Bl-68 820 (corresponding to U.S. Pat. No. 4,714,574), a second foam mixture is directly introduced on a first foam mixture at a time corresponding to a volumetric expansion of the first mixture of 100% to 2,300% so that one or more relatively rigid zones are formed within a relatively flexible foam. For this procedure, it is necessary to wait for the first reaction mixture to attain the necessary volumetric expansion before the second reaction mixture may be introduced. This has the undesirable effect of increasing the length of the foaming cycle in the mold. Moreover, the main aim of covering the more rigid zones with a layer of flexible foam to increase the seating comfort is difficult to achieve because the expansion of the flexible layer is limited to only small thicknesses in certain zones. Difficulties are also encountered in making these coverings sufficiently reproducible.

According to another process (U.S. Pat. No. 4,190,697), a more rigid foam formulation is introduced into the mold and allowed to start foaming. A flexible foam formulation is introduced when the first mixture has expanded to 10 to 80% of its full volume. This second mixture penetrates the first mixture when it is introduced and causes the first mixture to float upwards. Both mixtures then undergo reaction to produce a polyurethane foam product which has zones of differing density. This process has the disadvantage that penetration of the first reaction mixture introduced and the flow of second reaction mixture under the first mixture take place in an irregular fashion so that the properties of the molded parts (particularly the indentation hardness) obtained are not sufficiently reproducible.

None of these known processes suggest how, in the production of highly contoured cushions such as seating cushions with raised sideparts, it is possible to prevent the reaction mixture in the region of the flat central part of the seat from flowing down into the parts of the mold cavity which are to form the side parts. In practice, this problem has been solved by placing barriers at the bottom of the mold cavity to limit the flow of the reaction mixture which is to form the flat central part of the seat, so that cushions with zones of differing hardness can be obtained in a reproducible manner. Barriers of this kind naturally increase the cost of the mold and leave grooves (so called "pipes") in the part of the cushion in which they are placed. These grooves are in many cases covered up to some extent by providing beading in the form of piping on the cover in these positions. The grooves are, however, weak points which form the starting points for cracks when subjected to excessive loads.

The problem therefore arose of providing a process by which foam cushions of the type defined above may be produced more reproducibly and more simply, and in particular with shorter operating cycles, and which would also be able to withstand exceptional loads.

DESCRIPTION OF THE INVENTION

The above problems are solved by not introducing the reaction mixtures into the mold cavity until they have started to cream and are already highly viscous. A measurement therefor is the decrease in density and the increase in volume. The density should decrease at least to one third of that of the uncreamed mixture, which corresponds to an increase in volume of about 200%. As a result, the reaction mixtures, at most, only slightly spread outwards by flow. Any further increase in width is due to foaming rather than flow. If the reaction mixture is to cover relatively large extent by means of the device used for introducing it into the cavity. In such a case, the apparatus used for introducing the mixture, or the applicator nozzle, travels over the area while the reaction mixture is introduced. In order to achieve the necessary distribution, the mixture may be applied, for example, line-wise or in the form of spirals or at separate points of the particular area. The introduction of reaction mixtures which have already started to cream shortens the operating cycles.

The new process is particularly advantageous for producing cushions composed of more than two different foams. In such cases, the different reaction mixtures are introduced side by side, and in particular, in the form of straight or curved lines. The different reaction mixtures may also be introduced pointwise, in particular in different quantities, according to some suitable pattern resulting in the optimum seating comfort. Whichever procedure is employed, the state to which the mixture has creamed, i.e., its viscosity, must be adjusted, at the moment of its introduction, to the flow paths along which the mixture must still travel. This may most easily be determined empirically by tests. The different reaction mixtures may be introduced simultaneously or at different times. They may also differ in age, i.e., the components of each mixture may be mixed at different times.

It has been found particularly advantageous to introduce reaction mixtures which have already undergone a reduction in density of at least 2/3 before they enter the mold cavity. This measure ensures to some extent that excessive flowing of the reaction mixture will not occur.

The density is a measure of the viscosity. In a mixture which has not yet started to react, the density can be roughly assessed. The density of a mixture which has started to cream can be estimated from the increase in volume.

If the new process is employed for the production of seating cushions with raised side parts of the kind conventionally used in motor vehicles, care must be taken to ensure that when the reaction mixtures are introduced into the mold cavity, that mixture which is introduced into the region corresponding to the central part of the seating surface is already more viscous than that which is introduced into the regions which are to form the raised sides.

The two reaction mixtures may, of course, both have the same viscosity but in that case the reaction mixture introduced to form the central part of the seating surface must already be sufficiently stiff when introduced into the mold and must be so placed that it cannot flow over into the regions which are to form the side parts. The extent to which the reaction mixture for the side parts has creamed up is only important to the extent that it must continue to react sufficiently rapidly so that the mixture foaming up in the central region of the seat will not push too far outwards. The position in which the various reaction mixtures come into contact can be influenced by suitable choice of the various time factors and the reaction velocities of the reaction mixtures.

The invention is further illustrated, but is not intended to be limited by the following examples in which all parts and percentages are by weight unless otherwise specified.

EXAMPLES

EXAMPLE

A seat cushion for a motor vehicle must be produced with a central seating surface of relatively soft flexible foam and raised side parts of firmer flexible foam by back-foaming a piece of covering material which has been cut to shape. Two cold foam formulations are employed.

The first reaction mixture, which is to form the softer foam for the central part of the seat, has the following composition:

Component A 100 parts by weight of polyether obtained by the addition of propyleneoxide followed by ethyleneoxide to trimethylolpropane, having a functionality of 3 and a primary OH content of about 80% by weight and an OH number of about 30:

3.1 parts by weight of water;

0.2 parts by weight of bis-dimethylaminoethylether;

0.4 parts by weight of commercial foam stabilizer, consisting of a mixture of low molecular weight siloxanes (stabilizer KS 43 available from Bayer AG, West Germany):

0.8 parts by weight of triethylene diamine (33% in dipropyleneglycol):

4.0 parts by weight of the adduct of $CO_2$ to N-methylethanolamine.

Component B 54.0 parts by weight of an isocyanate with an isocyanate content of about 32.5% [isocyanate index of the system was 85), composed of about 65% by weight of 4,4'-diphenylmethane-diisocyanate and about 20% by weight of 2,4'-diphenylmethane-diisocyanate and about 15% by weight of polymeric MDI.

The second reaction mixture, which is to form the firmer foam for the side parts, has the following composition:

Component A 100 parts by weight of polyether, obtained by the addition of propyleneoxide followed by ethyleneoxide to trimethylolpropane, with a functionality of 3 and a primary OH content of about 80% by weight and an OH number of about 30:

3.1 parts by weight of water;

0.2 parts by weight of bis-dimethylaminoethylether;

0.4 parts by weight of commercial foam stabilizer consisting of a mixture of low molecular weight siloxanes (Stabilizer KS 43 of Bayer AG):

0.8 parts by weight of triethylene diamine (33% in dipropyleneglycol): and 4.0 parts by weight of the adduct of $CO_2$ to N-methylethanolamine.

Component B 70.6 parts by weight of an isocyanate with an isocyanate content of about 32.5% (NCO index was 110), containing about 65% by weight of 4,4'-diphenylmethanediisocyanate and about 20% by weight of 2,4'-diphenylmethane diisocyanate and about 15% by weight of polymeric MDI.

The cut piece of covering material is accurately placed against the wall of the cavity of a vacuum mold. Thereafter, the reaction mixture which is to form the more flexible foam (compression resistance according to DIN 53 577 of 3.3 kPa) is placed on the region of the mold cavity corresponding to the central part of the seat and at the same time the reaction mixture which is to form the firmer foam (compression resistance according to DIN 53 577 of 7.3 kPa) is placed on the regions for the side parts.

The reaction mixture provided for the central part of the seat and forming the more flexible foam is applied to the region of the central part in three lines, one at the center and two placed 5 cm from the edge of each side region. The second reaction mixture is introduced into the part of the mold cavity for the side regions. This reaction mixture must also be introduced in such a manner that excessively long flow paths are not required.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of foam cushions from different fluid reaction mixtures comprising introducing a first and at least one other reaction mixture into a mold cavity and leaving the mixtures to react to form a cushion having zones of differing elasticity or rigidity characterized in that the reaction mixtures are not introduced into the mod cavity until they have started to cream up, are already viscous, and have already undergone a reduction in density of at least two thirds.

2. The process of claim 1, characterized in that when the reaction mixtures are introduced into the mold cavity, the reaction mixture which is placed in the region corresponding to the central part of the seating surface is already more viscous than that which is introduced into the regions corresponding to the side parts.

* * * * *